(12) United States Patent
Crites et al.

(10) Patent No.: US 9,200,523 B2
(45) Date of Patent: Dec. 1, 2015

(54) TURBINE BLADE TIP COOLING

(75) Inventors: Daniel Cregg Crites, Mesa, AZ (US);
Mark C. Morris, Phoenix, AZ (US);
Steve Halfmann, Chandler, AZ (US)

(73) Assignee: HONEYWELL INTERNATIONAL INC., Morris Plains ( * ) Notice: Subject to any disclaimer, the term of this patent is extended or adjusted under 35 U.S.C. 154(b) by 795 days.

(21) Appl. No.: 13/419,729

(22) Filed: Mar. 14, 2012

(65) Prior Publication Data
US 2013/0243606 A1    Sep. 19, 2013

(51) Int. Cl.
F01D 5/18    (2006.01)

(52) U.S. Cl.
CPC .......... F01D 5/187 (2013.01); *F05D 2240/304* (2013.01); *F05D 2240/307* (2013.01); *Y02T 50/676* (2013.01)

(58) Field of Classification Search
CPC ......... F01D 5/186; F01D 25/08; F01D 5/187; F05D 2240/304; F05D 2240/307; F05D 2260/202
USPC .................................. 416/97 R, 92; 415/115
See application file for complete search history.

(56) References Cited

U.S. PATENT DOCUMENTS

| | | | |
|---|---|---|---|
| 6,174,135 B1 * | 1/2001 | Lee ............... | 416/97 R |
| 6,974,308 B2 | 12/2005 | Halfmann et al. | |
| 7,287,959 B2 | 10/2007 | Lee et al. | |
| 7,413,403 B2 | 8/2008 | Cunha et al. | |
| 7,806,659 B1 * | 10/2010 | Liang ........................ | 416/97 R |
| 7,857,587 B2 | 12/2010 | Correia et al. | |
| 8,052,378 B2 | 11/2011 | Draper | |
| 8,079,810 B2 | 12/2011 | Liang | |
| 8,079,813 B2 | 12/2011 | Liang | |
| 8,092,176 B2 | 1/2012 | Liang | |
| 2005/0025623 A1 * | 2/2005 | Botrel et al. ................ | 416/97 R |
| 2006/0222496 A1 * | 10/2006 | Lee et al. ..................... | 416/97 R |
| 2007/0071601 A1 * | 3/2007 | Papple ......................... | 416/97 R |

FOREIGN PATENT DOCUMENTS

| | | |
|---|---|---|
| EP | 1065344 A2 | 1/2001 |
| EP | 1367222 A2 | 12/2003 |
| EP | 1443178 A2 | 8/2004 |

OTHER PUBLICATIONS

EP Communication, EP 13157706.6-1610 dated Aug. 23, 2013.
EP Search Report, EP 13157706.6-1610 dated Jul. 1, 2013.
EP Examination Report for Application No. 13157706.6 dated Dec. 23, 2014.

* cited by examiner

*Primary Examiner* — Craig Kim
*Assistant Examiner* — Adam W Brown
(74) *Attorney, Agent, or Firm* — Ingrassia Fisher & Lorenz, PC

(57) ABSTRACT

A turbine blade includes a blade portion, the blade portion comprising a tip outer wall and a trailing edge, an internal cooling circuit, the internal cooling circuit being configured for directing cooling air within the blade portion, and a tip trailing edge slot positioned adjacent to the tip outer wall and the trailing edge, the tip trailing edge slot being fluidly connected to the internal cooling circuit. The tip outer wall is recessed at the tip trailing edge slot such that the tip outer wall is not provided over the trailing edge slot, thereby allowing cooling air to flow from the cooling circuit, into the trailing edge slot, and radially over the tip outer wall.

16 Claims, 5 Drawing Sheets

US 9,200,523 B2

TURBINE BLADE TIP COOLING

TECHNICAL FIELD

The inventive subject matter relates to turbine blades and, more particularly, to improved trailing edge blade tip cooling for high temperature cooled turbine blades.

BACKGROUND

Gas turbine engines, such as turbofan gas turbine engines, may be used to power various types of vehicles and systems, such as aircraft. Typically, these engines include turbines that rotate at a high speed when blades (or airfoils) extending therefrom are impinged by high-energy compressed air. Consequently, the blades are subjected to high heat and stress loadings which, over time, may reduce their structural integrity.

To improve blade structural integrity, a blade cooling scheme is typically incorporated into the turbines. The blade cooling scheme is included to maintain the blade temperatures within acceptable limits. In some cases, the blade cooling scheme directs cooling air through an internal cooling circuit formed in the blade. The internal cooling circuit may include a simple channel extending through a length of the blade or may consist of a series of connected, serpentine cooling passages, which incorporate raised or depressed structures therein. The serpentine cooling passages increase the cooling effectiveness by extending the length of the air flow path. In this regard, the blade may have multiple internal walls that form the intricate cooling passages through which the cooling air flows.

As the desire for increased engine efficiency continues to rise, engine components are increasingly being subjected to higher and higher operating temperatures. For example, newer engine designs may employ operating temperatures that are over 1100° C. However, current engine components, such as the blades, may not be adequately designed to withstand such temperatures over time. Hence, designs for improving cooling of the blades may be desired.

Turbine blade tips (at the extreme outer radial region) are difficult to cool due to geometry, manufacturing constraints, and the high velocity air that migrates from the pressure side of the airfoil to the suction side via the gap between the rotor tip and the turbine shroud. The trailing edge of the blade tip is particularly difficult to cool in a manner that does not detrimentally affect the turbine performance or introduce risk.

Hence, there is an unmet need in the art for a turbine blade having a cooling system that is capable of cooling the blade tip in high-temperature operating environments. The present disclosure addresses at least this need.

BRIEF SUMMARY

Disclosed are cooled turbine blades for gas turbine engines having improved blade tip cooling. In one embodiment, a turbine blade includes a blade portion, the blade portion including a tip outer wall and a trailing edge, an internal cooling circuit, the internal cooling circuit being configured for directing cooling air within the blade portion, and a tip trailing edge slot positioned adjacent to the tip outer wall and the trailing edge, the tip trailing edge slot being fluidly connected to the internal cooling circuit. The tip outer wall is recessed at the tip trailing edge slot such that the tip outer wall is not provided over the trailing edge slot, thereby allowing cooling air to flow from the cooling circuit, into the trailing edge slot, and radially over the tip outer wall.

In another embodiment, a gas turbine engine includes a plurality of turbine blades mounted radially about a turbine rotor, each of the plurality of turbine blades including a turbine blade that includes a blade portion, the blade portion including a tip outer wall and a trailing edge, an internal cooling circuit, the internal cooling circuit being configured for directing cooling air within the blade portion, and a tip trailing edge slot positioned adjacent to the tip outer wall and the trailing edge, the tip trailing edge slot being fluidly connected to the internal cooling circuit. The tip outer wall is recessed at the tip trailing edge slot such that the tip outer wall is not provided over the trailing edge slot, thereby allowing cooling air to flow from the cooling circuit, into the trailing edge slot, and radially over the tip outer wall.

In yet another embodiment, a turbine blade includes a blade portion, the blade portion including a tip outer wall and a trailing edge, an internal cooling circuit, the internal cooling circuit being configured for directing cooling air within the blade portion. The internal cooling circuit includes a channel positioned radially inward from the tip outer wall and fluidly connected to the tip trailing edge slot for providing cooling air to the tip trailing edge slot. The channel also includes a first portion and a second portion, the first portion being oriented generally parallel to the tip outer wall, the second portion being angled radially with respect to the tip outer wall for guiding the cooling air flow in the radial direction. The turbine blade further includes a plurality of trailing edge slots being fluidly connected to the internal cooling circuit and positioned along the trailing edge, the plurality of trailing edge slots including a tip trailing edge slot positioned adjacent to the tip outer wall and the trailing edge. The tip outer wall is recessed at the tip trailing edge slot such that the tip outer wall is not provided over the trailing edge slot, thereby allowing cooling air to flow from the cooling circuit, into the trailing edge slot, and radially over the tip outer wall. The tip trailing edge slot includes a tapered lower wall, the tapered lower wall being configured to direct cooling air flow around the trailing edge.

Furthermore, other desirable features and characteristics of the cooled turbine blades will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third turbine blades, simply denote different singles of a plurality unless specifically defined by language in the appended claims.

Figure 1:
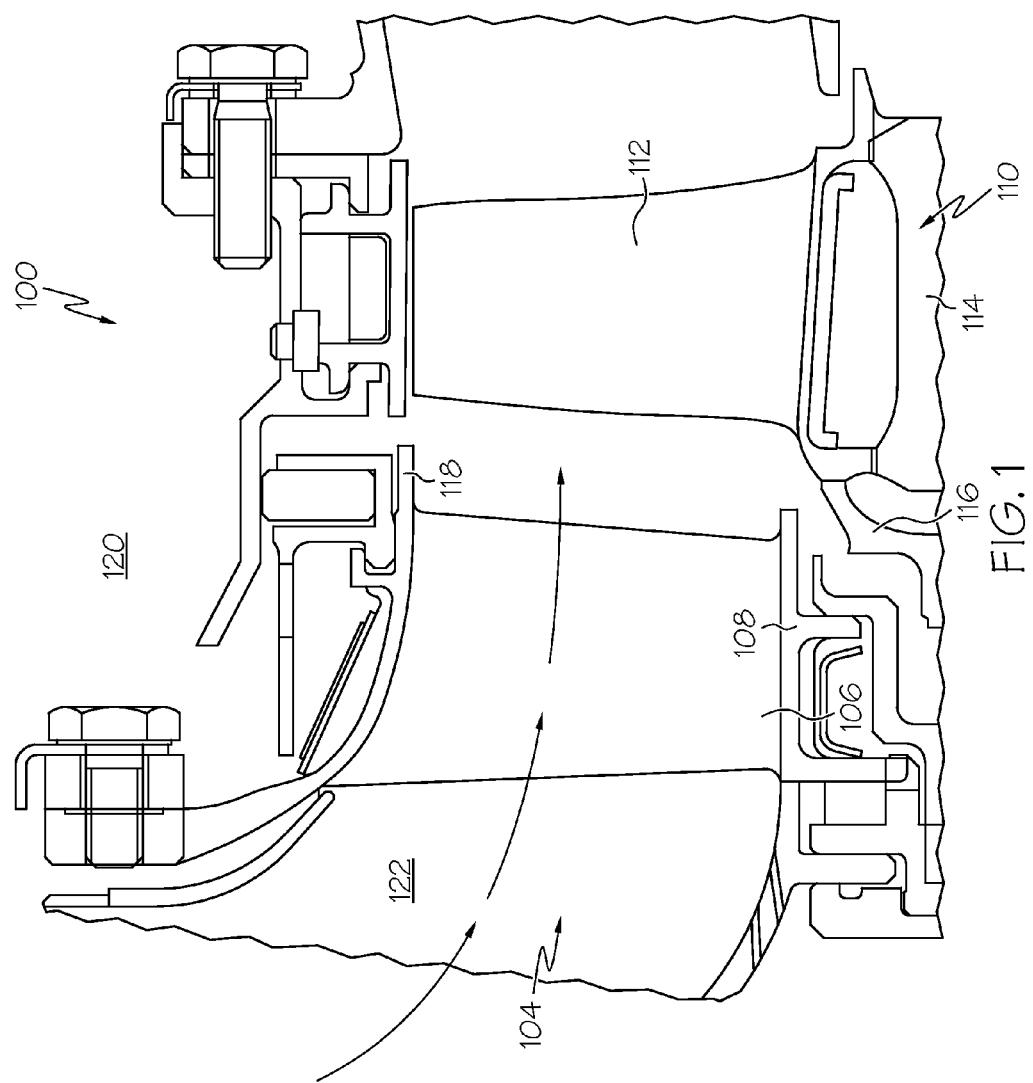
FIG. 1 is a cross-sectional side view of a portion of a turbine section of an engine, according to an embodiment.

FIG. 1 is a cross-sectional side view of a portion of a turbine section 100 of an engine, according to an embodiment. The turbine section 100 receives high temperature gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine rotor 110. According to an embodiment, the turbine rotor 110 includes a plurality of blades 112 (only one of which is shown) that are attached to a hub 114 and retained in axial position by a retention plate 116. When the blades 112 are impinged upon by the gases, the gases cause the turbine rotor 110 to spin. According to an embodiment, an outer circumferential wall 118 surrounds the static vanes 106 and the plurality of blades 112 to define a flowpath 122. The circumferential wall 118 also defines a portion of a compressor discharge plenum 120 that is disposed radially outwardly relative to the flowpath 122. The compressor discharge plenum 120 receives bleed air from a compressor section (not shown), which may be directed through one or more openings in the outer circumferential wall 118 towards the plurality of blades 112 to cool the blades 112.

Figure 2:
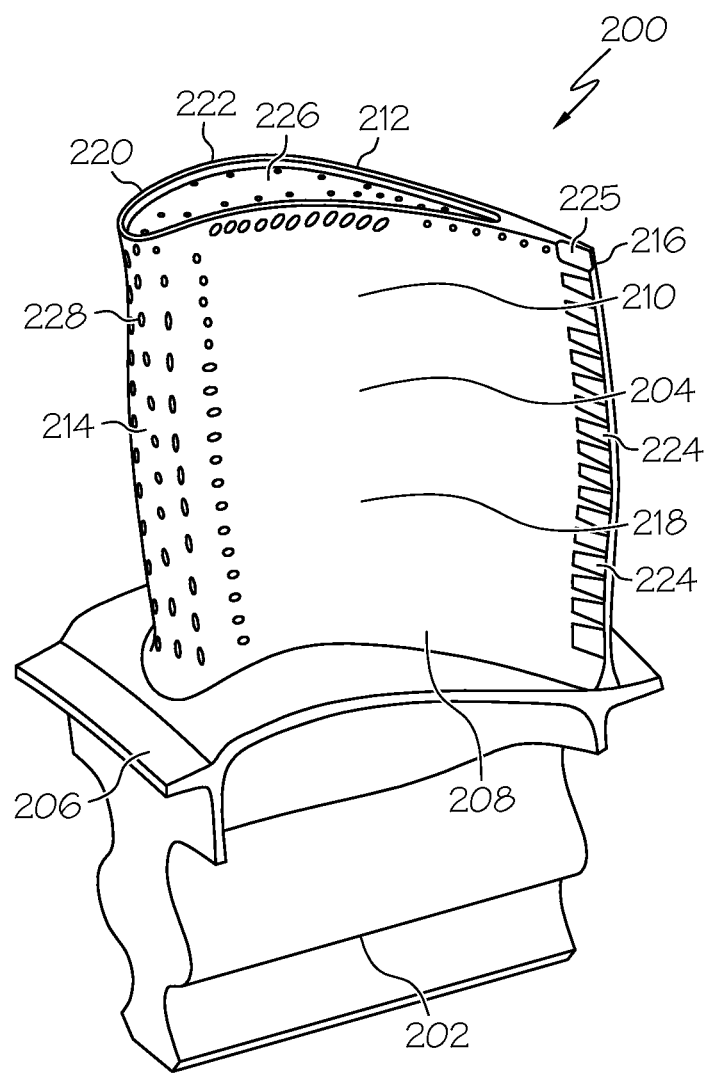
FIG. 2 is a perspective view of a turbine blade, in accordance with an embodiment.

FIG. 2 is a perspective view of a turbine blade 200, in accordance with an embodiment. The blade 200 may be implemented into a turbine rotor (e.g., turbine rotor 110 in FIG. 1) and may include a single crystal blade including a nickel-based superalloy, in an embodiment. Suitable nickel-based superalloys include, but are not limited to, MAR-M-247EA, MAR-M-247DS, or SC180. In other embodiments, the blade 200 may include a different superalloy. According to an embodiment, the blade 200 may be cast as an equi-axed, directionally solidified, or single crystal blade.

The blade 200 includes a blade attachment section 202, an airfoil 204, and a platform 206. The blade attachment section 202 provides an area in which a shape is machined. In an embodiment, the shape corresponds with a shape formed in a respective blade attachment slot (not shown) of the turbine hub (e.g., hub 114 in FIG. 1). For example, in some embodiments, the shape may be what is commonly referred to in the art as a "firtree" shape. In other embodiments, the shape may be a beveled shape. However, in other embodiments, any one of numerous other shapes suitable for attaching the blade 200 to the turbine may be alternatively machined therein.

The airfoil 204 has a root 208 and two outer walls 210, 212. The root 208 is attached to the platform 206 and each outer wall 210, 212 has outer surfaces that define an airfoil shape. The airfoil shape includes a leading edge 214, a trailing edge 216, a pressure side 218 along the first outer wall 210, a suction side 220 along the second outer wall 212, a tip outer wall 222, a plurality of pressure side discharge trailing edge slots 224 (the edge slot at the tip is the tip trailing edge slot 225), a tip plenum 226 recessed radially inward from the tip outer wall 222, and a series of holes 228 (commonly referred to in the art as "film cooling" holes). Holes 228 may be provided along the leading edge 214, along the first outer wall 210 near the tip outer wall 222, and/or along the tip plenum 226. Though not shown in FIG. 2, the blade 200 may have an internal cooling circuit formed therein, which may extend from an opening in the platform 206 through the blade 200 and may include various passages that eventually communicate with the plurality of trailing edge slots 224 and the tip trailing edge slot 225, or other openings (not shown) that may be formed in the blade 200. In particular, the convex suction side wall 212, the concave pressure side wall 210, and the tip 222 each include interior surfaces defining the internal cooling circuit.

Figure 3:
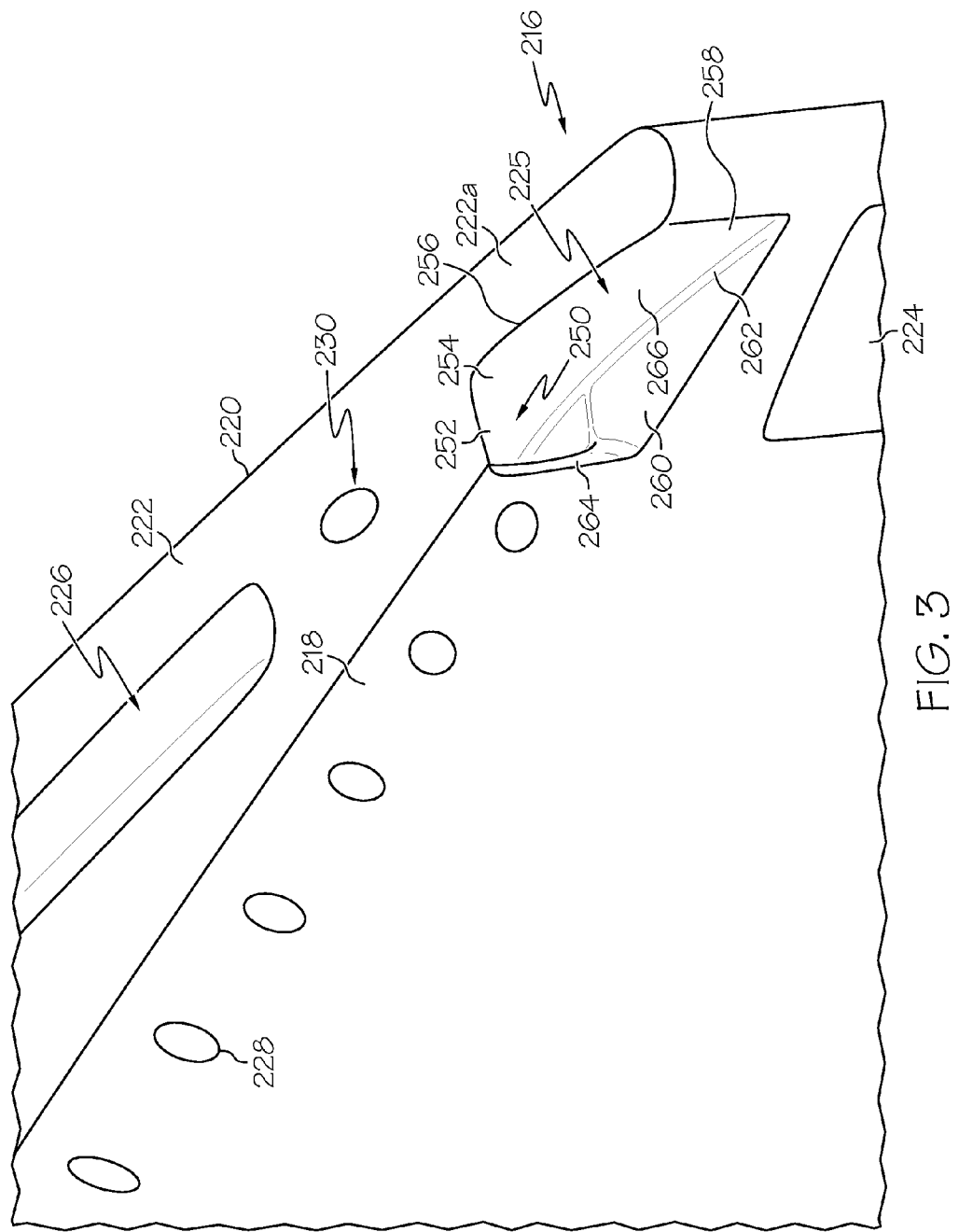
FIG. 3 shows the perspective view of the turbine blade of FIG. 3, expanded in the area of the turbine blade trailing edge tip.

With reference now to FIG. 3, an expanded view of the region of the blade 200 surrounding the tip trailing edge slot 225 is provided. As shown therein, in accordance with an embodiment, the tip outer wall 222 is removed from the region over the tip trailing edge slot 225. From the pressure side 218, the perimeter of the tip outer wall 222 is recessed or angled inward from the outer wall 210 at the tip trailing edge slot 225 such that no tip outer wall is formed over the tip trailing edge slot 225. As such, a narrow tip outer wall portion 222a is formed proximate to the suction side 220 portion of the blade adjacent to the tip trailing edge slot 225. In one exemplary embodiment, the tip outer wall 222 is removed from the area over the tip trailing edge slot 225 by machining after a standard airfoil-shaped blade with trailing edge slots has been cast. In another exemplary embodiment, the blade is cast in the configuration shown in FIG. 3 (i.e., without the tip outer wall 222 being present over the tip trailing edge slot 225) using a mold that has been pre-configured to provide for this feature.

The narrowing of the tip outer wall 222 so as to avoid covering the tip trailing edge slot 225 can be accomplished generally with any pattern that deviates from the normal tapering of the blade (as in a traditional airfoil shape). For example, as shown in FIG. 3, the tip outer wall 222 narrows toward the suction side 220 with a tip outer wall perimeter edge 252 that is generally perpendicular (or otherwise angled) with respect to the outer wall 210. The tip outer wall 222 perimeter then curves (referring to tip outer wall perimeter curve feature 254) to become parallel with the outer wall 212 as it extends along the tip trailing edge slot 225 in portion 222a thereof (referring to tip outer wall perimeter edge 256). Other patterns to remove the tip outer wall 222 over the tip trailing edge slot 225 are possible, and those having ordinary skill in the art will be readily able to design other patterns in accordance with the teachings of the present disclosure.

Without the presence of the tip outer wall 222 over the tip trailing edge slot 225, the tip trailing edge slot is "open" in the radial direction, i.e., air can flow radially from the tip trailing edge slot 225 without obstruction from the tip outer wall 222. In this configuration, the tip trailing edge slot 225 is defined by a slot inner wall 266 that is generally parallel to the outer wall 212 and formed radially inward from the perimeter edge 256, a slot lower wall 260 (with an edge or a curve feature 262 connecting the slot inner wall 266 to the slot lower wall 260), a slot trailing edge 258, and a slot front edge 264. The relative proportions and configuration of the slot inner wall 266, the slot lower wall 260, the slot trailing edge 258, and a slot front edge 264 can be designed and configured to accommodate the desired airflow of cooling air out of the tip trailing edge slot 225. Analytical tools known in the art, such as conjugate heat transfer (CHT) analysis tools, can be employed by a person having ordinary skill in the art to select a suitable "open" tip trailing edge slot design for any given turbine blade implementation, in accordance with the teachings of the present disclosure.

In operation, cooling air exits the tip trailing edge slot 225 through opening 250, which is defined by the slot front edge 264, the tip outer wall perimeter edge 252, the slot inner wall 266, and the slot lower wall 260. The cooling air exits the tip trailing edge slot 225 in a direction that is both chordwise and radial with respect to the rotation of the blade. As such, the cooling air exits through the opening 250 and proceeds toward the slot trailing edge 258 and also toward the tip outer wall perimeter edge 256 to provide cooling air flow to the trailing edge 216.

Figure 4:
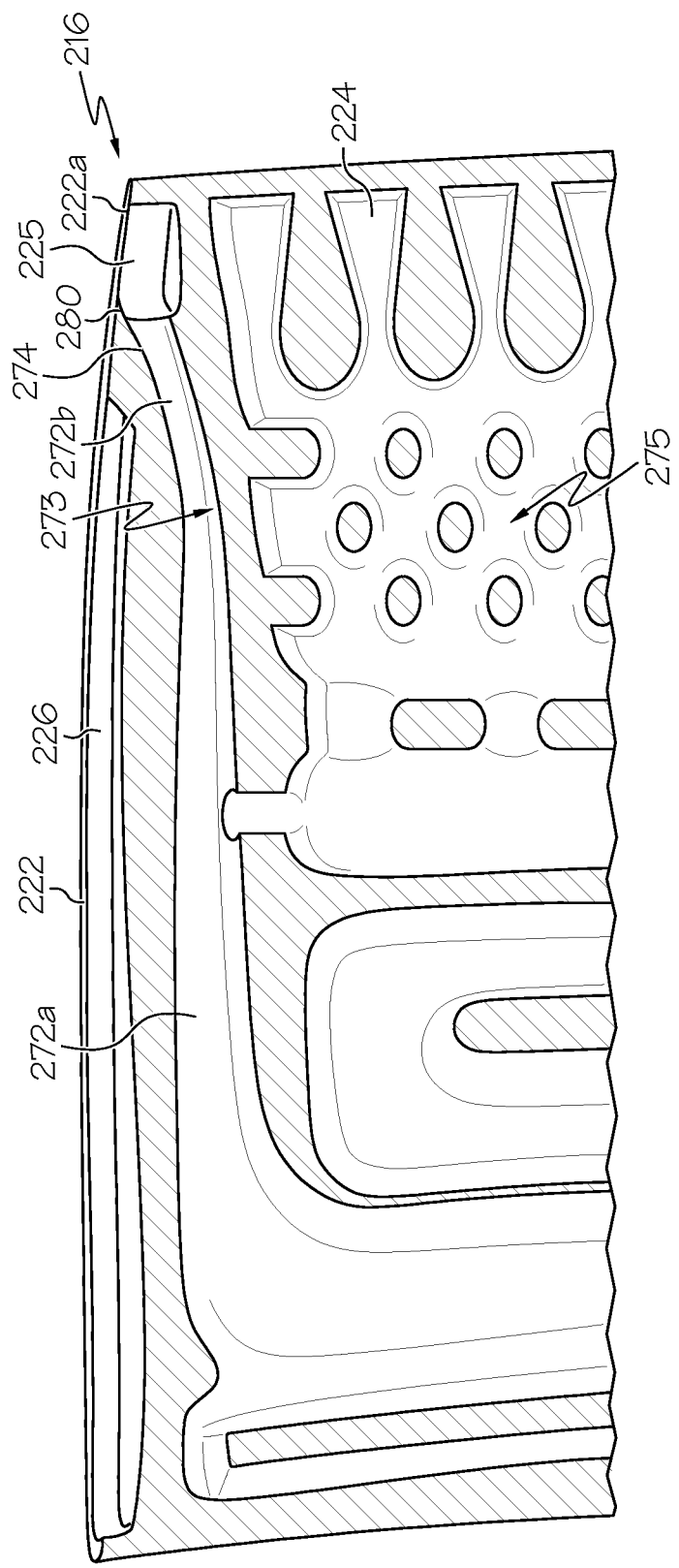
FIG. 4 is a cross-sectional view of a portion of the turbine blade of FIG. 2.
Figure 5:
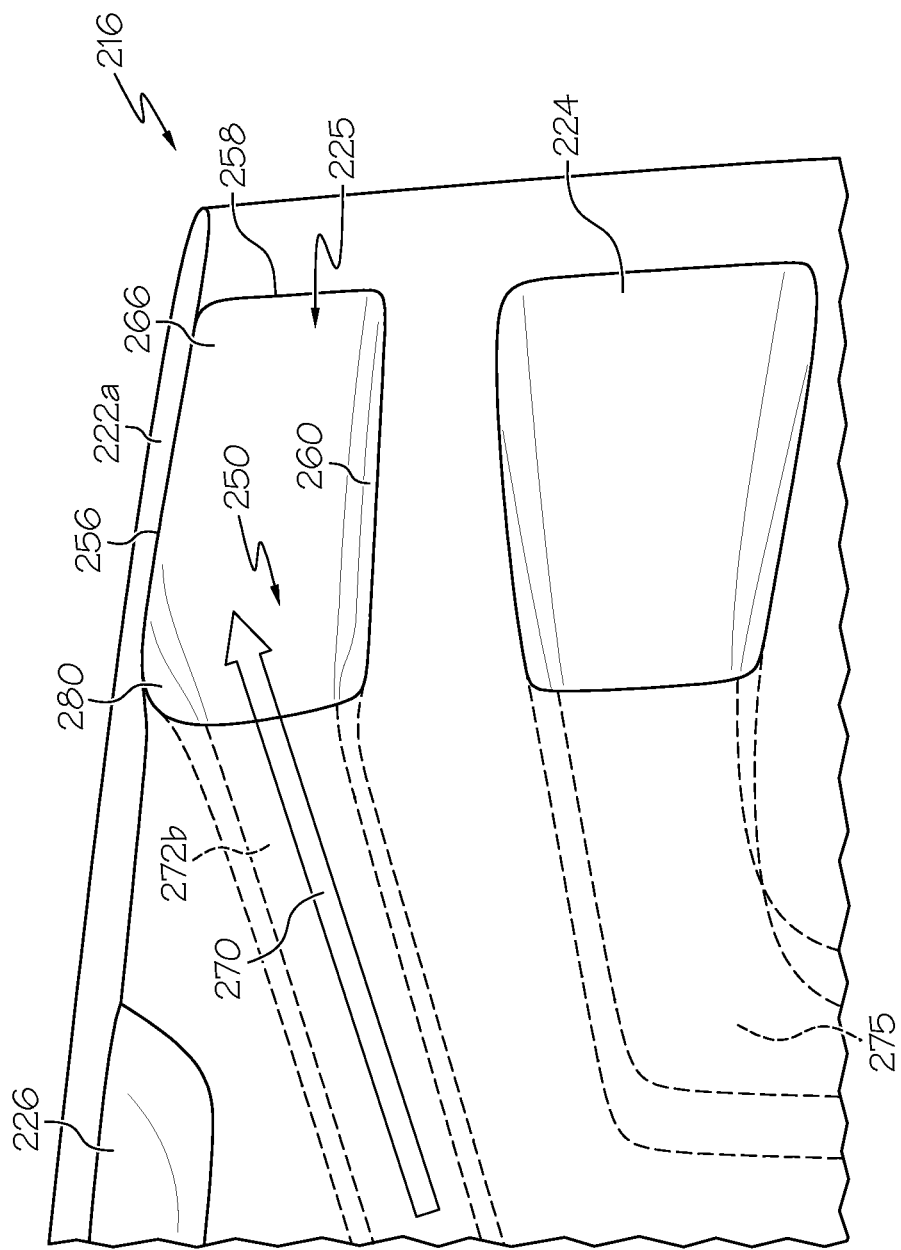
FIG. 5 shows the cross-sectional view of the turbine blade as in FIG. 4, expanded in the area of the turbine blade trailing edge tip.

In FIGS. 4 and 5, a cross-section of a portion of the blade 200 is shown (FIG. 5 being an expanded view of FIG. 4 in the area of the tip trailing edge slot 225), illustrating the internal cooling circuit 275 formed therein. Cooling air (indicated by arrow 270) flowing to the tip trailing edge slot 225 proceeds through a channel portion 272a that runs generally parallel to tip outer wall 222 until it reaches bend 273, located near the tip trailing edge slot 225. Bend 273 guides the cooling air flow radially into channel portion 272b, such that when it enters the tip trailing edge slot 225, it has a radial velocity enabling it to flow radially outward toward the tip outer wall perimeter edge 256. The bend 273 and the radially outer wall 274 of flow channel portion 272b are designed to impart a radial component of velocity to the cooling air 270 without causing flow separation. In some embodiments, an expansion transition or fillet 280 may be provided near the opening 250 that utilizes the Coandra effect (the tendency of a fluid stream to be attracted to a nearby surface), in conjunction with rotational body forces, to diffuse the cooling air flow with minimal separation before the flow travels over the tip outer wall perimeter edge 256 (and also over the tip outer wall portion 222a) to provide cooling to the trailing edge 216. The length of the channel 272b over which the radial angle acts is sufficiently long so as to provide direction and metering to the cooling air flow. CHT analysis tools, for example, can be employed by a person having ordinary skill in the art to select a suitable bend 273 angle and position with respect to the tip trailing edge slot 225 for any given turbine blade implementation to give the cooling air the desired radial flow characteristics over the outer wall portion 222a to provide sufficient cooling to the trailing edge 216. In alternate embodiments cooling air 270 may be supplied from cooling circuit 275 prior to reaching bend 273.

As best shown in FIG. 5, the slot lower wall 260 in the tip trailing edge slot 225 is tapered to diffuse the cooling flow in the trailing edge slot 225. The angle between channel 272b and slot lower wall 260 is used to draw cooling flow over the slot trailing edge 258. Thus, with cooling air being directed over the outer wall portion 222a and the slot trailing edge 258, substantially the entire trailing edge 216 is provided with sufficient cooling air flow to maintain the trailing edge 216 within acceptable temperature limits.

In a further aspect of the present disclosure, it has been found to be desirable to move the tip plenum 226 forward (with respect to the rotation of the blade, and relative to prior art designs) to allow for the radial bend 273 and the channel portion 272b, which directs cooling air flow radially over the outer wall portion 222a. Holes 228 in the tip plenum 226 as well as holes 228 along the pressure side 218 are used to provide cooling to the tip plenum 226 and to the outer wall 222 in the region between the tip plenum 226 and the tip trailing edge slot 225. In some embodiments, one or more film holes 230, as best illustrated in FIG. 3, may be added behind the tip plenum 226 for additional cooling in this region.

As discussed above, for any turbine blade design, the optimized configuration for the present invention is determined from a computational fluid mechanics CHT analysis on a configuration that includes the features described herein. As such, it is expected that the size, shape, position, angle, or dimensions of any feature described herein can be optimized by a person having ordinary skill in the art for any given turbine design using CHT analysis.

While at least one exemplary embodiment has been presented in the foregoing detailed description, it should be appreciated that a vast number of variations exist. It should also be appreciated that the exemplary embodiments of the heat exchange system are only examples, and are not intended to limit the scope, applicability, or configuration of the invention in any way. Rather, the foregoing detailed description will provide those skilled in the art with a convenient road map for implementing an exemplary embodiment of the inventive heat exchange system. It is understood that various changes may be made in the function and arrangement of elements described in an exemplary embodiment without departing from the scope of the invention as set forth in the appended claims.

What is claimed is:

1. A turbine blade comprising:
a blade portion, the blade portion comprising a tip outer wall and a trailing edge;
an internal cooling circuit, the internal cooling circuit being configured for directing cooling air within the blade portion; and
a tip trailing edge slot comprising a lower wall and positioned adjacent to the tip outer wall and the trailing edge, the tip trailing edge slot being fluidly connected to the internal cooling circuit,
wherein the internal cooling circuit comprises a channel positioned radially inward from the tip outer wall and fluidly connected to the tip trailing edge slot for providing cooling air to the tip trailing edge slot, and wherein the channel comprises a first portion and a second portion, the first portion being oriented generally parallel to the tip outer wall, the second portion being angled radially with respect to the tip outer wall for guiding the cooling air flow in the radial direction, wherein the tip trailing edge lower wall is oriented generally parallel to the first portion, wherein the second portion is positioned between the first portion and the tip trailing edge lower wall, and wherein a radially lower surface of the first portion, a radially lower surface of the second portion, and the tip trailing edge lower wall form a contiguously-and continuously-connected channel radially lower surface, and
wherein the tip outer wall is recessed at the tip trailing edge slot such that the tip outer wall is not provided over the trailing edge slot, thereby allowing cooling air to flow from the cooling circuit, into the trailing edge slot, and radially over the tip outer wall.

2. The turbine blade of claim 1, further comprising a plurality of trailing edge slots, the plurality of trailing edge slots being fluidly connected to the internal cooling circuit and positioned along the trailing edge radially inward from the tip trailing edge slot.

3. The turbine blade of claim 1, wherein the channel comprises a radial upper surface and a radial lower surface, and further comprising an expansion fillet at the radial upper surface adjacent to the tip trailing edge slot, the expansion fillet being configured to diffuse cooling air flow over the tip outer wall with minimal flow separation.

4. The turbine blade of claim 1, wherein the tip trailing edge slot lower wall is tapered, the tapered lower wall being configured to direct cooling air flow around the trailing edge.

5. The turbine blade of claim 1, wherein the tip outer wall is recessed at the tip trailing edge slot at an angle relative to a pressure side outer wall of the blade portion.

6. The turbine blade of claim 1, further comprising a tip plenum recessed radially inward from the tip outer wall.

7. The turbine blade of claim 6, further comprising one or more holes in the tip outer wall, the one or more holes being positioned between the tip plenum and the tip trailing edge slot.

8. The turbine blade of claim 1, wherein the configuration of the tip trailing edge slot and the channel of the internal cooling circuit is determined analytically by utilizing a conjugate heat transfer analysis.

9. A gas turbine engine comprising:
a plurality of turbine blades mounted radially about a turbine rotor, each of the plurality of turbine blades comprising:
a blade portion, the blade portion comprising a tip outer wall and a trailing edge;
an internal cooling circuit, the internal cooling circuit being configured for directing cooling air within the blade portion; and
a tip trailing edge slot comprising a lower wall and positioned adjacent to the tip outer wall and the trailing edge, the tip trailing edge slot being fluidly connected to the internal cooling circuit,
wherein the internal cooling circuit comprises a channel positioned radially inward from the tip outer wall and fluidly connected to the tip trailing edge slot for providing cooling air to the tip trailing edge slot, and wherein the channel comprises a first portion and a second portion, the first portion being oriented generally parallel to the tip outer wall, the second portion being angled radially with respect to the tip outer wall for guiding the cooling air flow in the radial direction, wherein the tip trailing edge lower wall is oriented generally parallel to the first portion, wherein the second portion is positioned between the first portion and the tip trailing edge lower wall, and wherein a radially lower surface of the first portion, a radially lower surface of the second portion, and the tip trailing edge lower wall form a contiguously-and continuously-connected channel radially lower surface, and
wherein the tip outer wall is recessed at the tip trailing edge slot such that the tip outer wall is not provided over the trailing edge slot, thereby allowing cooling air to flow from the cooling circuit, into the trailing edge slot, and radially over the tip outer wall.

10. The gas turbine engine of claim 9, wherein the channel comprises a radial upper surface and a radial lower surface, and further comprising an expansion fillet at the radial upper surface adjacent to the tip trailing edge slot, the expansion fillet being configured to diffuse cooling air flow over the tip outer wall with minimal flow separation.

11. The gas turbine engine of claim 9, wherein the tip trailing edge slot lower wall is tapered, the tapered lower wall being configured to direct cooling air flow around the trailing edge.

12. The gas turbine engine of claim 9, wherein the tip outer wall is recessed at the tip trailing edge slot at an angle relative to a pressure side outer wall of the blade portion.

13. The gas turbine engine of claim 9, further comprising a tip plenum recessed radially inward from the tip outer wall.

14. The gas turbine engine of claim 13, further comprising one or more holes in the tip outer wall, the one or more holes being positioned between the tip plenum and the tip trailing edge slot.

15. The gas turbine engine of claim 9, wherein the configuration of the tip trailing edge slot and the channel of the internal cooling circuit is determined analytically by utilizing a conjugate heat transfer analysis.

16. A turbine blade comprising:
a blade portion, the blade portion comprising a tip outer wall and a trailing edge;
an internal cooling circuit, the internal cooling circuit being configured for directing cooling air within the blade portion, and wherein the internal cooling circuit comprises a channel positioned radially inward from the tip outer wall and fluidly connected to the tip trailing edge slot for providing cooling air to the tip trailing edge slot, wherein the channel comprises a first portion and a second portion, the first portion being oriented generally parallel to the tip outer wall, the second portion being angled radially with respect to the tip outer wall for guiding the cooling air flow in the radial direction; and
a plurality of trailing edge slots being fluidly connected to the internal cooling circuit and positioned along the trailing edge, the plurality of trailing edge slots comprising a tip trailing edge slot positioned adjacent to the tip outer wall and the trailing edge,
wherein the tip outer wall is recessed at the tip trailing edge slot such that the tip outer wall is not provided over the trailing edge slot, thereby allowing cooling air to flow from the cooling circuit, into the trailing edge slot, and radially over the tip outer wall, and wherein the tip trailing edge slot comprises a tapered lower wall that is generally parallel to the first portion of the channel, the second portion of the channel being positioned between the first portion of the channel and the tapered lower wall, and wherein a radially lower surface of the first portion, a radially lower surface of the second portion, and the tip trailing edge lower wall form a contiguously-and continuously-connected channel radially lower surface, the tapered lower wall being configured to direct cooling air flow around the trailing edge.

\* \* \* \* \*